US012438314B2

(12) United States Patent
Pymm

(10) Patent No.: US 12,438,314 B2
(45) Date of Patent: Oct. 7, 2025

(54) DIGITAL INTERFACE CABLE FOR USE WITH COMMUNICATIONS EQUIPMENT AND METHODS OF MAKING AND USING THE SAME

(71) Applicant: Kevin Pymm, Laurinburg, NC (US)

(72) Inventor: Kevin Pymm, Laurinburg, NC (US)

( * ) Notice: Subject to any disclaimer, the term of this patent is extended or adjusted under 35 U.S.C. 154(b) by 318 days.

(21) Appl. No.: 18/142,417

(22) Filed: May 2, 2023

(65) Prior Publication Data

US 2024/0372306 A1 Nov. 7, 2024

(51) Int. Cl.
*H01R 24/56* (2011.01)
*H01R 13/6592* (2011.01)
*H01R 24/64* (2011.01)

(52) U.S. Cl.
CPC ....... *H01R 24/568* (2013.01); *H01R 13/6592* (2013.01); *H01R 24/64* (2013.01)

(58) Field of Classification Search
CPC ... H01R 24/54; H01R 24/568; H01R 13/6592
USPC .................................................. 439/638, 502
See application file for complete search history.

(56) References Cited

U.S. PATENT DOCUMENTS 6,250,936 B1 * 6/2001 Armistead ....... H01R 13/65915 439/98
7,316,584 B2 * 1/2008 Mackillop .......... H01R 13/6477 439/607.05
8,076,990 B2 * 12/2011 Pischl ................ H01R 13/6461 333/185
8,175,237 B2 5/2012 Shaw et al.
8,272,876 B2 * 9/2012 Schultz .................... H05K 1/16 439/38
8,308,505 B2 * 11/2012 Hatton ................... H01R 43/28 439/502
8,425,251 B1 * 4/2013 Pedruzzi ............ H01R 13/5812 439/470
9,509,934 B2 * 11/2016 Barnett ............ H04N 21/42204
9,923,288 B2 * 3/2018 Bertrand .............. H01R 13/622
10,573,433 B2 * 2/2020 Goebel ................ H01B 13/016
10,712,512 B2 * 7/2020 Ho ..................... G02B 6/38875
11,211,753 B2 * 12/2021 Truong ..................... G06F 1/26
2016/0118758 A1 * 4/2016 Cymerman .......... H01R 31/065 439/502

OTHER PUBLICATIONS

Tigertronics SLCAB6PM for virtually all radios with a 6-pin mini DIN data port URL: https://www.ebay.com/itm/133766387962 Mar. 13, 2023.
Furuno 0.5M 6 pin to RJ45 cable URL: https://www.thegpsstore.com/Marine-Electronics/Marine-Accessories/Furuno-Accessories/Furuno-05M-6-Pin-to-RJ45-Cable Mar. 13, 2023.

* cited by examiner

*Primary Examiner* — Hae Moon Hyeon
(74) *Attorney, Agent, or Firm* — Dogwood Patent and Trademark Law; Ashley D. Johnson

(57) ABSTRACT

The invention is a digital communications interface cable that can be used with a variety of devices, such as (but not limited to) radios and NATO connector capable radios. The cable includes a 5-pin or 6-pin connector attached at one end of a CAT6 cable. The cable further includes an RJ45 connector that interfaces to external sound card devices. A small ferrite core can be affixed to the interface cable at the second end to mitigate and prevent electromagnetic interference. Advantageously, the interface cable facilitates the transmission of digital communications from radios using a computer.

19 Claims, 7 Drawing Sheets

DIGITAL INTERFACE CABLE FOR USE WITH COMMUNICATIONS EQUIPMENT AND METHODS OF MAKING AND USING THE SAME

FIELD OF THE INVENTION

The presently disclosed subject matter is directed to a digital interface cable for use with communications equipment (e.g., NATO (North Atlantic Treaty Organization) 5-pin and 6-pin radios) and to methods of making and using the disclosed interface cable.

BACKGROUND OF THE INVENTION

HF/VHF/UHF (High Frequency/Very High Frequency/Ultra High Frequency) Digital Communication encompasses a large variety of radio communication techniques that utilize digital tones to transmit information over the airwaves. The tones are produced by digital signal processing algorithm (DSPA) software on a computer and are carried by an interface cable from the computer's internal or external sound card to the radio. The tones can efficiently transmit a wide range of data. Using appropriate equipment (e.g., a computer with an appropriate soundcard device, DSPA software such as FLDIGI (Fast Light Digital) and a properly configured interface cable), the functionality of a radio can be significantly increased. Particularly, digital communications enabled through a Digital Communications Kit are generally more resilient to interference, possess error correction features, have a much higher data rate, and enable the transfer of image, text, or other files through radios that do not normally possess similar capabilities. Such features are especially advantageous during times of crisis, emergencies, and/or national disasters when standard communication methods are often disrupted. For example, radio digital communications enable the transmission of critical command and control information, such as evacuee lists, inventories, weather forecasts, directions to aid locations, situation updates, and the like. Attempting similar digital communications with traditional voice communications has proven to be extremely slow, tedious, and prone to transcription error. In addition, replicating other features of digital communications (such as sending digital files or images) is impossible using traditional voice communications.

Commonly, the military is employed in environments where the existing communications infrastructure of a local populace is damaged, degraded, or destroyed (e.g., during natural disasters, combat environments, or in non-combatant evacuation conditions). In such situations, a non-standard digital communications capability would prove to be extremely valuable and would expand the interoperability of military forces with local authorities, non-government organizations, volunteers, and/or mission partners. Currently, the limiting factor preventing the implementation of a non-standard digital communications capability is the digital communications interface cable. Most radios currently employed by the U.S. Military utilize standard NATO 5-PIN and 6-PIN connectors as an audio and data interface. Although the market is not extensive, digital communications interface cables are commercially available for most civilian and HAM radios. However, there is currently no interface cable available to support NATO connector capable radios. It would therefore be beneficial to provide a digital communications cable configured for use with a variety of digital communications equipment, such as NATO equipment.

SUMMARY OF THE INVENTION

The presently disclosed subject matter is directed to a digital communications interface cable. Specifically, the cable comprises a category 6 (CAT6) cable defined by a first end and an opposed second end. The interface cable includes a 5-pin or 6-pin connector positioned at the first end of the CAT6 cable. The interface cable further includes an RJ45 connector positioned at the second end of the CAT6 cable. The CAT6 cable includes a plurality of interior wires that span a length of the cable, and each pin of the 5-pin or 6-pin connector is attached to an interior wire of the CAT6 cable. The digital communications interface cable is configured to connect a radio to the sound card of a computer. Advantageously, one advantage of the presently disclosed subject matter is the ability to bridge the gap between the radio and a computer that has DSPA software on it. Any type of computer could be used (Raspberry Pi™, a laptop computer, a desktop, or any other type of computing device capable of running DSPA software and an appropriate soundcard device configured to electrically isolate the radio from the computer. Historically, these are non-standard and are sold as an external soundcard device separate from a computer's internal soundcard).

In some embodiments, the 5-pin or 6-pin connector is configured for mating with a radio output plug.

In some embodiments, the digital communications interface cable further includes a ferrite core affixed at the second end, between the CAT6 cable and the RJ45 connector.

In some embodiments, the computer is selected from one or more of the following: a laptop, desktop, Raspberry Pi™, or other small board computer. The soundcard device can be selected from a Tigertronics Signal Link™ or equivalent product from Velox Solutions™, EvriTECH™, and/or EVCON Group™.

In some embodiments, the 5-pin or 6-pin connector comprises an outer shield and a recessed face comprising 5 or 6 pins.

In some embodiments, each pin has a function selected from one of the following: common ground for audio, radio audio output, push to transmit release to listen line, microphone input, analog data input for transmission or digital data clock out, digital data mode select, direct current (DC) power, retransmission, ground for digital data, digital data for transmission input.

In some embodiments, there are no wires connected to a center pin of the 6-pin connector.

In some embodiments, each pin of the 5-pin or 6-pin connector is attached to an interior wire of the CAT6 cable is attached via soldering.

In some embodiments, the 5-pin or 6-pin connector comprises resin surrounding connections between the wires of the CAT6 cable and each pin.

In some embodiments, the resin is selected from polyetherimide, polyphenylene sulfide, polyether ether ketone, polyethersulfone, polyphenylsulfone, polyphenyleneether, or combinations thereof.

In some embodiments, the digital communications interface cable includes a portion of heat shrink tubing positioned at the first end, second end, or both of the CAT6 cable.

In some embodiments, the digital communications interface cable further comprises a nylon braided material positioned over an exterior surface of the CAT6 cable.

In some embodiments, the presently disclosed subject matter is directed to a kit comprising the disclosed digital communications interface cable.

In some embodiments, the kit further comprises a computing device, digital signal processing algorithm software, and an electrically isolated computer sound card configured to send and receive audio signals, tones, or both.

In some embodiments, the presently disclosed subject matter is directed to a method of coupling a radio with an external soundcard device of a computer. Specifically, the method comprises attaching the 5-pin or 6-pin connector of the digital communications interface cable of claim 1 to a receiving socket on the radio. The method includes attaching the RJ45 connector to a receiving end of the digital communications device, whereby the radio is mated with the digital communications device.

In some embodiments, the external soundcard device is directly integrated into the cable, replacing the RJ45 connector and terminating in a standard USB A male connector. Thus, the interface cable connects to a sound card device of a computer at one end and a radio with NATO connector at the other end.

DETAILED DESCRIPTION OF THE INVENTION

Figure 1:
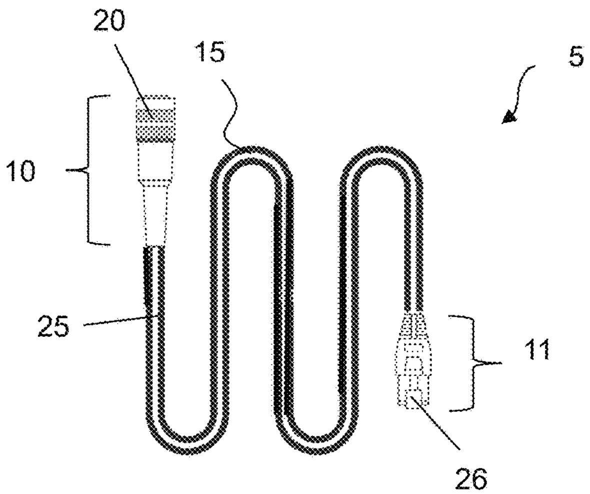
FIG. 1 is a top plan view of an interface cable in accordance with some embodiments of the presently disclosed subject matter.

For the purpose of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods. Thus, the term "about" is used to provide flexibility to a numerical range endpoint by providing that a given value may be "slightly above" or "slightly below" the endpoint without affecting the desired result.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any unclaimed element as essential to the practice of the invention.

Unless otherwise defined, all technical terms used herein have the same meaning as commonly understood by one of ordinary skill in the art to which this disclosure belongs.

The presently disclosed subject matter is directed to a digital communications interface cable that can be used with a variety of devices, such as (but not limited to) radios and NATO connector capable radios. The term "cable" broadly refers to any structure capable of carrying a signal, such as a bundle of electrical wires. "Interface cables" include any type of cable that enables digital communications (e.g., messages, photographs, images, audio, video, multimedia clips, attached filed, and/or any other data items). "NATO radios" refer to radios and other communication devices utilized by a number of North Atlantic Treaty Organization (NATO) armed forces. The disclosed interface is configured to couple a NATO radio to a sound card device of a computer. In this way, cable 5 replaces a military handset. Military handsets are often required for voice communicators, but cable 5 connects the disclosed radio to a computer for digital communications.

As illustrated in FIG. 1, interface cable 5 includes first and second ends 10, 11. First end 10 is configured with NATO connector 20 (e.g., a 5-pin or 6-pin NATO connector). CAT6 cable 25 is attached to connector 20, providing a secure connection. Second end 11 of interface cable 5 includes RJ45 connector 26 that interfaces to external sound card devices. A small ferrite core can be affixed to interface cable 5 at second end 11 to mitigate and prevent electromagnetic interference, as discussed in detail below. The RJ45 connector can be reinforced with a section of heat shrink tubing in some embodiments. The term "ferrite" refers to a material with a significant ferrimagnetic or ferromagnetic component (percent by weight). In some embodiments, the term ferrite includes a sintered compact represented by the following formula: $(M1_2O)x(M_2O)y(c)z$. In the formula, M1 is a monovalent metal; M2 is a divalent metal; and, when $x+y+z=1.0$, x and y are each $0\leq(x, y)\leq0.8$ and z is $0.2<z<1.0$. At least one species of metal atom can be selected from the group comprising: lithium, iron, manganese, magnesium, calcium, or strontium as the M1 and M2.

Thus, the disclosed interface cable includes a NATO connector positioned at first end 10, thereby allowing interface cable 5 to be electrically connected to a mating connector on a network radio. Connector 20 can be a standard military connector used by U.S. and NATO Armed Forces as an interface for data and audio connections. For example, speakers, microphones, push to transmit devices, headsets, handsets, and/or cryptographic equipment can utilize connector 20 to interface with a radio. The term "radio" broadly includes any device used to wirelessly transmit and receive impulses or signals representing data, information, and/or messages. The term "speaker" broadly refers to any type of electroacoustic transducer configured to convert an electrical signal into audible sound. The term includes electrodynamic loudspeakers (or just "loudspeakers"), piezoelectric speakers, flat panel speakers, plasma arc speakers, and the like. The term "microphone" refers to any acoustic-to-electric transducer or sensor that converts sound in air into an electrical signal. The term "push to transmit" refers to systems wherein pushing a button or key closes a circuit that triggers the radio to transmit whatever signals it is receiving through an audio port (e.g., audio from a human voice or the audio tones from a DSPA).

The term "handset" refers to all types of headsets, headphones, and other head worn audio playback devices, such as for example circum-aural and supra-aural headphones, ear buds, in ear headphones, and other types of (wearable) earphones. The term "cryptographic equipment" broadly refers to a radio set, a network encryptor, a feeder encryptor, an encrypting audio receiver, an encrypting terminal, and the like.

Figure 2A:
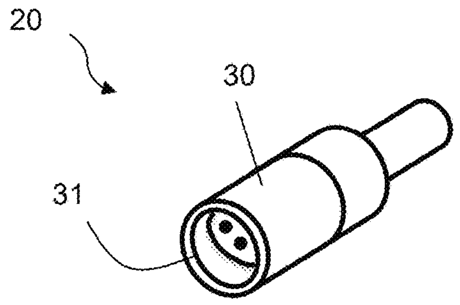
FIG. 2*a* is a perspective view of an interface cable 6-pin connector in accordance with some embodiments of the presently disclosed subject matter.

FIG. 2*a* illustrates one embodiment of connector 20 (also referred to as a U-229 connector in some embodiments). The U-229 connector is used by the U.S. military for audio connections to field radios, typically for connecting a handset. There are five-pin and six-pin versions, the sixth pin version using the extra pin to power accessories. Connector 20 is also used by the National Security Agency to load cryptographic keys into encryption equipment from a fill device.

Figure 2B:
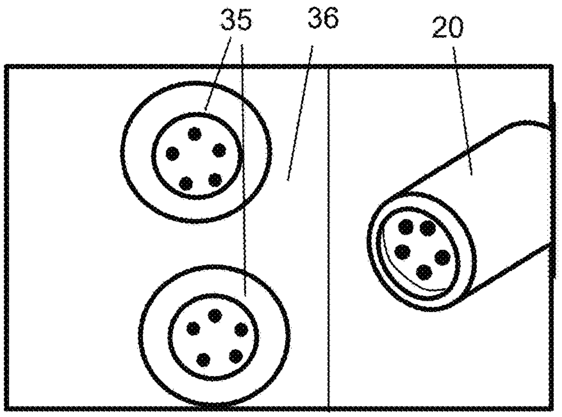
FIG. 2*b* is a perspective view of an interface cable 6-pin connector and a corresponding radio in accordance with some embodiments of the presently disclosed subject matter.
Figure 2C:
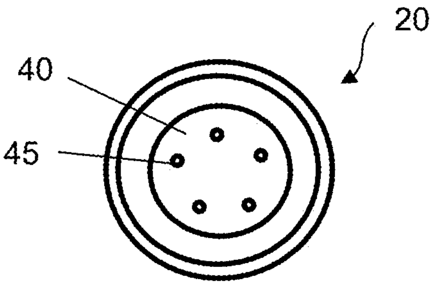
FIG. 2*c* is a top plan view of an interface cable comprising a connector with 5 pins in accordance with some embodiments of the presently disclosed subject matter.
Figure 2D:
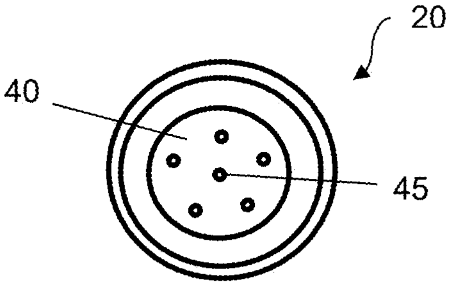
FIG. 2*d* is a top plan view of an interface cable first end comprising a connector with 6 pins in accordance with some embodiments of the presently disclosed subject matter.

As shown, connector 20 includes shield 30 comprising a series of interior screw threads 31 that can be used to reversibly attach the connector to a corresponding socket 35, as shown in FIG. 2*b*. However, the connector is not limited to screw threads 31 and any attachment element can be used. Shield 30 can protect the interior face of the connector from damage. Radio 36 employs a plurality of sockets 35 that can cooperate with connector 20. Connector 20 further includes face 40 comprising a plurality of pins 45. The disclosed connector 20 can have a number of pin variants as illustrated in FIGS. 2*c* and 2*d*. For example, the connector can be a 5-pin or 6-pin connector. Thus, the standard connector includes 5 pins, but 6-pin versions can also be used, with an additional pin located at the approximate center of face 40.

Each pin 45 includes a unique function, such as (but not limited to) common ground for audio, radio audio output (e.g., to drive a handset speaker), push to transmit release to listen line, microphone input, analog data input for transmission or digital data clock out, and/or digital data mode select. The middle pin can be used as a source of DC power to power accessories (e.g., for speaker microphones), retransmission, ground for digital data, digital data for transmission input. In some embodiments, there are no wires connected to the center pin, allowing for a future modification.

Figure 2E:
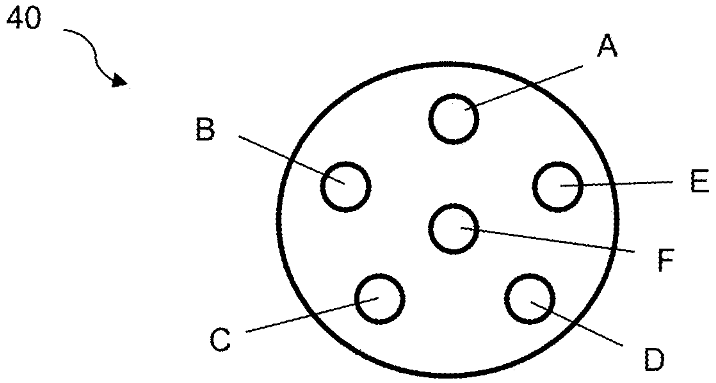
FIG. 2*e* is a top plan view of an interface cable first end pin arrangement in accordance with some embodiments of the presently disclosed subject matter.

FIG. 2*e* is one exemplary embodiment of face 40 comprising pins A-F. Pin A can be common ground for audio and is typically the same as chassis ground. Pin B can be used for a radio audio output to drive a speaker or audio output (e.g., handset speaker or headphones). Pin C can be a push to transmit (PTT) and release to listen line. When grounded, Pin C puts the transmitter into transmit mode and when released into receive mode. Pin C is therefore neither an input or output, but acts as a buss line. Any equipment that connects to Pin C can ground to it. Pin D can be the microphone input into the radio (e.g., the analog audio input or microphone terminal). Pin E can be used for different purposes, such as vehicle power input, CW (continuous wave) key input, high speed CW, loudspeaker line, retrains PTT to key the other Receive/Transmit (RT). Pin F can be used for different purposes, such as DC power for speaker microphones and the like and retransmission PTT output. Pin F can also lack a wire connected to it, allowing for future modification. Advantageously, nearly all US and NATO equipment utilizes the same pinout for connector 20, ensuring that all accessories are compatible. However, it should be appreciated that the pinout for connector 20 can have any suitable layout and is not limited to the configuration of FIG. 2*e*.

Figure 3A:
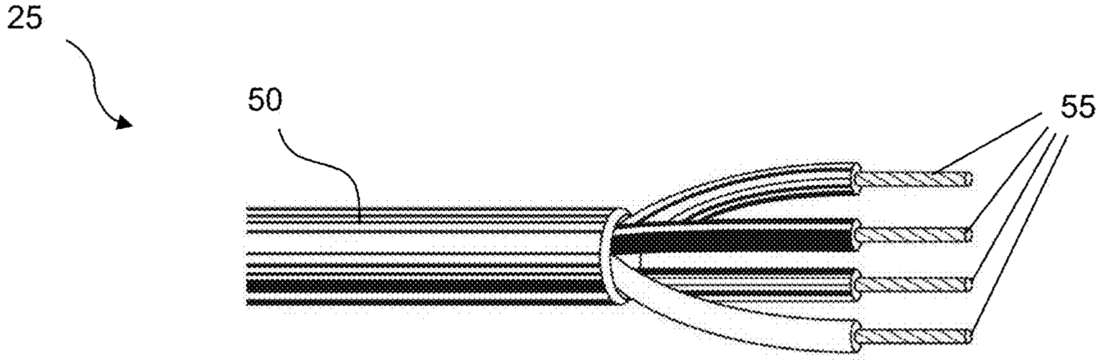
FIG. 3*a* is a perspective view of a CAT6 cable comprising a plurality of wires in accordance with some embodiments of the presently disclosed subject matter.

As set forth above, interface cable 5 includes a length of CAT6 cable 25 positioned adjacent to connector 20. One embodiment of cable 25 is illustrated in FIG. 3*a*. As shown, CAT6 cable is a standardized twisted pair cable for ethernet and other network physical layers. In some embodiments, cable 25 specifies performance of up to 250 MHz. The cable includes exterior shielding 50 that can be configured as a metal foil designed to limit or prevent unwanted electromagnetic interference. The metal foil can be constructed from any suitable metal, such as (but not limited to) aluminum, copper, and the like. In some embodiments, the shielding can extend the full length of cable 25. While the disclosed interface cable has been described as including a CAT6 cable, it should be appreciated that any of a wide variety of multi-conductor cables, such as (but not limited to) any Category 5 or 6 (CAT5, CAT6, CAT6A) ethernet cable or any other cable suitable to facilitate hardwire communication. A category 6 cable is a standardized twisted pair cable for ethernet and other network physical layers that is backward compatible with the Category 5/5e and Category 3 cable standards, as defined by the Electronic Industries Association and Telecommunications Industry Association (incorporated by reference herein). Category 6 must meet more stringent specifications for crosstalk and system noise than Category 5 and 5e. The cable standard specifies performance of up to 250 MHz, compared to 100 MHz for Category 5 and 5e. The Category 6 Augmented cable standard, or CAT6a, was created to further improve the performance of CAT6 Ethernet cables. Using CAT6a enables 10 Gigabit Ethernet data rates over a single cable run up to 328 feet. CAT 6 supports 10 Gigabit Ethernet only up to 164 feet of cable length. With the higher performance, CAT 6a cables generally cost more than CAT 6 and are slightly thicker.

Figure 3B:
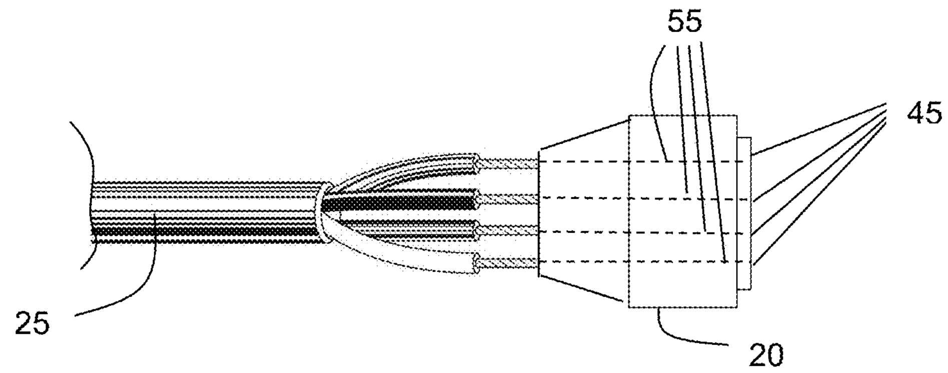
FIG. 3*b* is a side plan view of a CAT6 cable wired to a 6-pin connector in accordance with some embodiments of the presently disclosed subject matter.

As illustrated in FIG. 3*b*, one end of CAT6 cable 25 is stripped and the individual interior wires 55 are soldered to a corresponding pin in connector 20. For example, one wire 55 can be soldered to the D pin of connector 20 for the microphone line. In some embodiments, one wire can be soldered to the A pin for the ground line. In some embodiments, one wire can be soldered to the C pin for the PTT line. In some embodiments, one wire can be soldered to the B pin for a speaker line. One or more wires can also be unconnected. The term "soldering" refers to a process of joining two metal surfaces together using a filler metal (called "solder"). The process involves heating the surfaces to be joined and melting the solder, which is then allowed to cool and solidify, thereby creating a strong and durable joint. Although FIG. 3*b* illustrates only 4 wires 55 being attached to pins 45, any number of wires can be used (e.g., 5 wires for a 5-pin connector and 6 wires for a 6-pin connector).

Figure 3C:
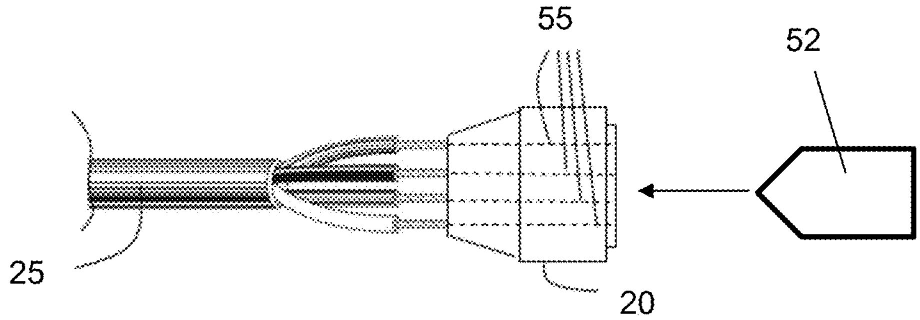
FIG. 3*c* is a side plan view of adding hot resin to the connections between the CAT6 wires and the connector pins in accordance with some embodiments of the presently disclosed subject matter.

Once the soldered connections are complete between the CAT6 cable and corresponding pins 45, a durable, weatherproof hot resin 52 can be extruded into the connection cavity to reinforce and insulate the connections between wires 55 and pins 45, as shown in FIG. 3*c*. Any suitable hot resin can be used, such as (but not limited to) polyetherimide, polyimide, polyphenylene sulfide, polyether ether ketone, polyethersulfone, polyphenylsulfone, polyphenyleneether, or combinations thereof.

Figure 3D:
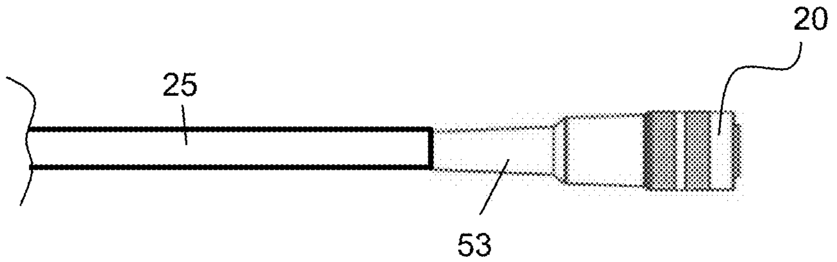
FIG. 3*d* is a side plan view of a first end of an interface cable comprising a CAT6 cable wired to a 6-pin connector in accordance with some embodiments of the presently disclosed subject matter.

After reassembling the connector by attaching the barrel end of connector 20 (as shown in FIG. 3*d*), a portion of heat shrink tubing 53 can be secured to reinforce the seat of the connector to the CAT6A cable. As would be known in the art, the tubing can overlap both connector 20 and cable 25 to maintain the connection. The term "heat shrink tubing" refers to a heat-shrinkable tubing material that has been subjected to heat-shrinking process that caused the tubing to shrink at least generally radially inward from a first, larger diameter, to a second, significantly smaller diameter. Any heat shrink tubing can be used, such as (but not limited to) low density polyethylene, polypropylene, polytetrafluoroethylene, polyvinyl chloride, and copolymers thereof.

Figure 4A:
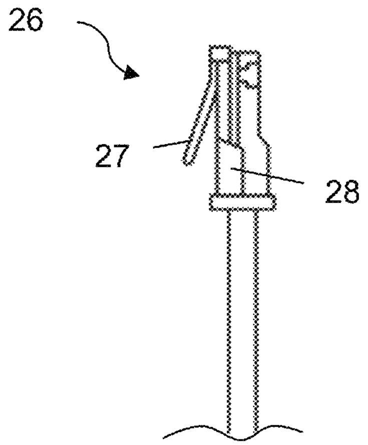
FIG. 4*a* is a side plan view of an interface cable plug connector in accordance with some embodiments of the presently disclosed subject matter.
Figure 4B:
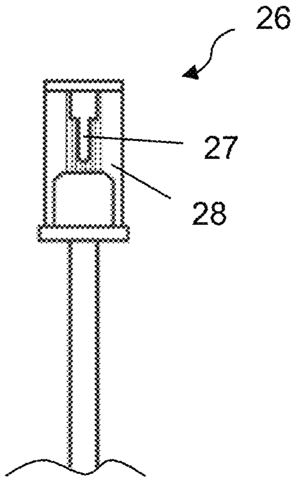
FIG. 4*b* is a top plan view of the plug connector of FIG. 4*a* in accordance with some embodiments of the presently disclosed subject matter.

As noted above, second end 11 of the disclosed interface cable 5 includes RJ45 plug connector 26 that interfaces to external sound card devices. One embodiment of the plug connector is illustrated in FIGS. 4*a* and 4*b*. A registered jack (RJ) is a standardized telecommunication network interface for connecting voice and data equipment to a service provided by a local exchange carrier or long distance carrier. RJ45 refers to a modular 8-position (8-pin) jack or plug defined according to an international connector standard. The RJ45 interface is typically used for data transmission, and the most common application is a network adapter interface. The plug connector can include locking tab 27 to interlock with a matching receptacle. The plug connector can also include one or more cores 28 that surround four twisted-pair copper conductors (8 conductors total). The RJ45 connector is configured to retain a complimentary coupling mechanism on a mating end of interface cable 5.

RJ45 plug connectors typically feature eight pins to which the wire strands of a cable interface electrically. Each plug has eight locations spaced about 1 mm apart into which individual wires are inserted using special cable crimping tools. The industry calls this type of connector 8P8C, shorthand for eight position, eight contact. Ethernet cables and 8P8C connectors must be crimped into the RJ45 wiring pattern to function properly.

Figure 4C:
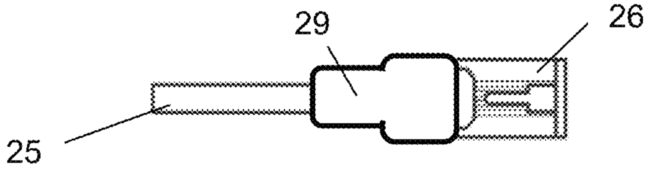
FIG. 4*c* is a top plan view of an interface cable plug connector comprising a portion of heat shrink tubing in accordance with some embodiments of the presently disclosed subject matter.

The plug connector can be assembled on the second end of the CAT6 cable according to standard practice. In some embodiments, the attachment between the CAT6 cable and the plug connector can be reinforced with a section of heat shrink tubing 29, as described above and shown in FIG. 4*c*.

Figure 5:
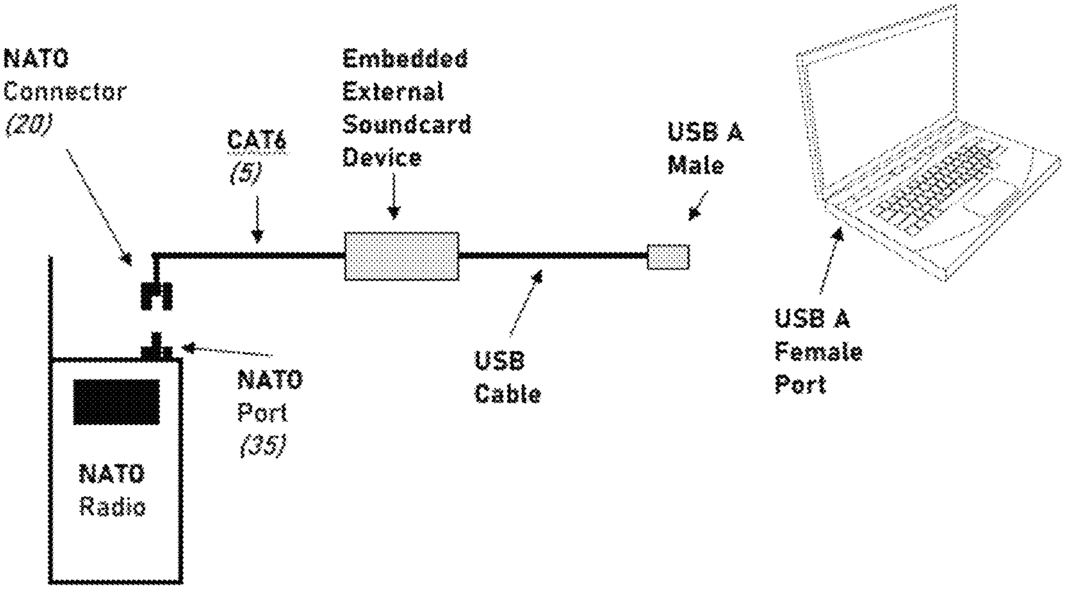
FIG. 5 is a schematic of a cable comprising a connector at one end and an external sound card device at the other end in accordance with some embodiments of the presently disclosed subject matter.

In some embodiments, the external soundcard device is directly integrated into the cable, replacing the RJ45 connector and terminating in a standard USB A male connector, as shown in FIG. 5. As shown, the radio includes a port (e.g., a NATO port) as is known in the art. Interface cable 5 can be used, configured with connector 20 on a first end and an external soundcard device on the other end. The cable can be connected to a USB A male connector for attachment to a computer, as shown.

The term "sound card" refers to an internal expansion card that provides input and output of audio signals to and from a computer under the control of computer programs. Sound functionality can also be integrated onto the motherboard, using components similar to those found on plug-in cards. The integrated sound system is often still referred to as a sound card. Sound processing hardware is also present on modern video cards with HDMI to output sound along with the video using that connector; previously they used a S/PDIF connection to the motherboard or sound card. Typical uses of sound cards or sound card functionality include providing the audio component for multimedia applications such as music composition, editing video or audio, presentation, education, and entertainment (games) and video projection. Sound cards are also used for computer-based communication such as voice over IP and teleconferencing.

Sound cards use a digital-to-analog converter (DAC) that converts recorded or generated digital signal data into an analog format. The output signal can be connected to an amplifier, headphones, or external device using standard interconnects, such as a TRS phone connector. A common external connector is the microphone connector. Input through a microphone connector can be used, for example, by speech recognition or voice over IP applications. Most sound cards have a line in connector for an analog input from a sound source that has higher voltage levels than a microphone. In either case, the sound card uses an analog-to-digital converter to digitize this signal. Some cards include a sound chip to support the production of synthesized sounds, usually for real-time generation of music and sound effects using minimal data and CPU time. The card may use direct memory access to transfer the samples to and from main memory, from where a recording and playback software may read and write it to the hard disk for storage, editing, or further processing.

Figure 6:
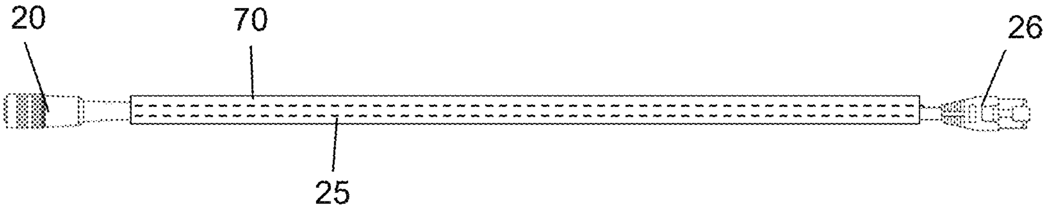
FIG. 6 is a top plan view of an interface cable comprising braided nylon covering in accordance with some embodiments of the presently disclosed subject matter.

In some embodiments, nylon braid 70 that functions are a protective cable armor can be applied over CAT6 cable 25. In some embodiments, the braid can be slid over at least a portion of the plug connector and/or connector 20, as shown in FIG. 6. Thus, a portion of nylon braiding can be slid onto cable 25 and secured to connector 20 end with a portion of heat shrink tubing or any conventional element. Additional heat shrink tubing can be slid onto the cable from the open side during this step and used to finalize cable 5. The nylon braid helps to protect the cable from stress due to abrasion, pinching, or bending and extends the usable life of the cable.

Figure 7A:
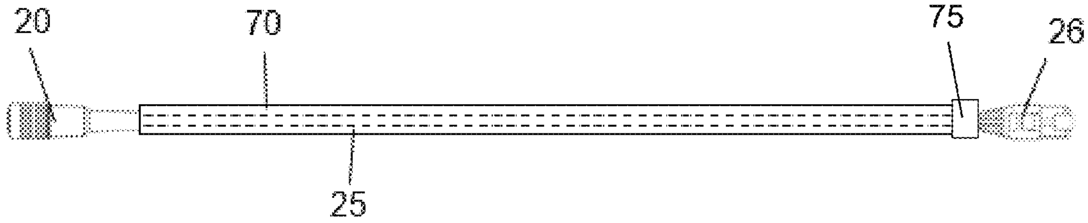
FIG. 7*a* is a top plan view of an interface cable comprising a ferrite core in accordance with some embodiments of the presently disclosed subject matter.
Figure 7B:
FIG. 7*b* is a top plan view of a CAT6 cable comprising a ferrite core at a second end in accordance with some embodiments of the presently disclosed subject matter.

As a final step, a small ferrite core 75 can be affixed to the RJ45 side of the interface cable in some embodiments. For example, the attachment hardware can be snugly snapped onto the CAT6A cable 25 on top of the nylon braid armor, as shown in FIGS. 7*a* and 7*b*. The ferrite core can function to mitigate and prevent electromagnetic interference from affecting the transmission of data along the cable during operation. Ferrite cores are commonly used for this practice.

Cable 5 can be configured in any desired length, such as about 2-3 feet. Thus, the cable can have length of at least about (or no more than about) 1-10 feet (e.g., at least/no more than about 1, 2, 3, 4, 5, 6, 7, 8, 9, or 10 feet). The term “length” refers to the longest straight line distance between first and second ends 10, 11.

Figure 8:
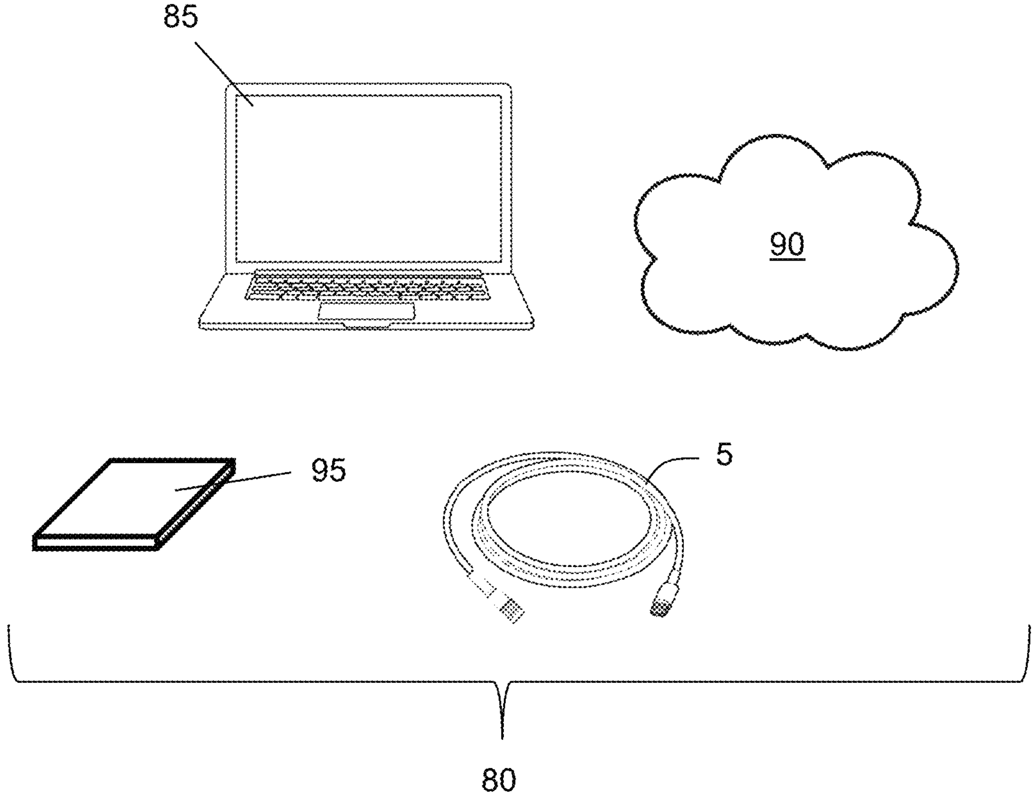
FIG. 8 is a schematic of a kit in accordance with some embodiments of the presently disclosed subject matter.

Interface cable 5 can be included as part of a Non-standard Digital Communications kit frequently used by the military. As shown in FIG. 8, kit 80 can include computing device 85. The computing device can be selected from any device that includes an information processing module, such as (but not limited to) desktop computer, laptop computer, tablet, notebook computer, and the like). The kit can further include DSPA software (e.g., FLDIGI) 90 that can be installed on the computing device. The digital signal processing algorithm allows for the processing of digital signals in real time and with low latency. In some embodiments, the computer can include a processing core that processes the DSPA. Thus, the DSPA can be loaded into the computer memory and processed by the computer processing core. Kit 80 can also include computer sound card 95 (e.g., Tigertronics® Signalink) used to send auditory information. Specifically, the sound card can change analog sound into digital data for computer 85 to understand. The kit can further include the disclosed interface cable 5 for desired radios. A single kit can support digital communications for multiple radios by simply swapping the interface cable as needed.

The primary operators of NATO connector capable radios domestically are the National Guard and local, state and, federal law enforcement entities. Since the Amateur Radio Emergency Services (ARES) within the United States encourages digital communications during times of crisis, emergencies, and/or national disasters, it would be highly advantageous to integrate into communication networks with organic communication equipment. Improving interoperability in such scenarios can facilitate ongoing command and control efforts, as well as increase the efficient allocation of time, resources, and manpower.

Further, it is common for two nations to possess different communications technology and/or equipment. In the United States, many foreign allies and partner forces utilize commercially available equipment, even within their military units. Thus, secure communication between U.S. forces and a partner force or element can prove challenging since U.S. cryptographic methods are highly restricted and protected. In such instances, Non-standard Digital Communication kits can be utilized to enable encrypted communication between the two elements using either open-source or proprietary encryption software hosted on the kit computer system.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A digital communications interface cable comprising:

a first cable comprising 6 wires, the first cable defined by a first end and an opposed second end;

a U-229 5-pin or 6-pin connector positioned at the first end of the first cable and a first end of an embedded external soundcard device positioned at the second end of the first cable;

wherein the first cable includes the 6 wires that span a length of the first cable, and each pin of the U-229 5-pin or 6-pin connector is attached to an interior wire of the first cable;

a second cable positioned with a first end and a second end, the first end of the second cable positioned at a second end of the embedded external soundcard device and the second end of the second cable comprising a Universal Serial Bus (USB) connector, wherein the digital communications interface cable is configured to connect a radio via the U-229 5-pin or 6-pin connector and a computer via the USB connector.

2. The digital communications interface cable of claim 1, wherein the U-229 5-pin or 6-pin connector is configured for mating with an output plug of the radio.

3. The digital communications interface cable of claim 1, further comprising a ferrite core affixed at the second end of the first cable.

4. The digital communications interface cable of claim 1, wherein the U-229 5-pin or 6-pin connector comprises an outer shield and a recessed face comprising 5 or 6 pins.

5. The digital communications interface cable of claim 1, wherein each pin has a function selected from one of the following: common ground for audio, radio audio output, push to transmit release to listen line, microphone input, analog data input for transmission or digital data clock out, digital data mode select, direct current (DC) power, retransmission, ground for digital data, digital data for transmission input.

6. The digital communications interface cable of claim 1, wherein there are no wires connected to a center pin of the U-229 5-pin or 6-pin connector.

7. The digital communications interface cable of claim 1, wherein each pin of the U-229 5-pin or 6-pin connector is attached to an interior wire of a CAT6 cable is attached via soldering.

8. The digital communications interface cable of claim 1, wherein the U-229 5-pin or 6-pin connector comprises a resin surrounding connections between the wires of a CAT6 cable and each pin.

9. The digital communications interface cable of claim 8, wherein the resin is selected from polyetherimide, polyphenylene sulfide, polyether ether ketone, polyethersulfone, polyphenylsulfone, polyphenyleneether, or combinations thereof.

10. The digital communications interface cable of claim 1, further comprising a portion of heat shrink tubing positioned at the first end, second end, or both of a CAT6 cable.

11. The digital communications interface cable of claim 1, further comprising a nylon braided material positioned over an exterior surface of a CAT6 cable.

12. A kit comprising the digital communications interface cable of claim 1.

13. The kit of claim 12, further comprising a computing device configured for use with the digital communications interface cable, digital signal processing algorithm software configured for use with the computing device, and a computer sound card configured to send auditory information via the digital communications interface cable.

14. A method of coupling a radio with an external digital communications device, the method comprising:

attaching the U-229 5-pin or 6-pin connector of the digital communications interface cable of claim 1 to a receiving socket on the radio;

attaching a RJ45 connector to a receiving end of the external digital communications device;

whereby the radio is mated with the digital communications device.

15. The method of claim 14, wherein external digital communications device is selected from one or more of the following: speakers, microphones, push to transmit devices, headsets, handsets, and cryptographic equipment.

16. The method of claim 14, wherein the U-229 5-pin or 6-pin connector is configured for mating with an output plug of the radio.

17. The method of claim 14, wherein each pin has a function selected from one of the following: common ground for audio, radio audio output, push to transmit release to listen line, microphone input, analog data input for transmission or digital data clock out, digital data mode select, direct current (DC) power, retransmission, ground for digital data, digital data for transmission input.

18. The method of claim 14, wherein the U-229 5-pin or 6-pin connector comprises resin surrounding connections between the wires of a CAT6 cable and each pin, and wherein the resin is selected from polyetherimide, polyphenylene sulfide, polyether ether ketone, polyethersulfone, polyphenylsulfone, polyphenyleneether, or combinations thereof.

19. The method of claim 14, wherein the digital communications interface cable comprises a portion of heat shrink tubing positioned at the first end, second end, or both of a CAT6 cable.

* * * * *